United States Patent
Choi et al.

Patent No.: US 6,931,323 B2
Date of Patent: Aug. 16, 2005

(54) APPARATUS AND METHOD OF COMPENSATING FOR AN ATTITUDE ERROR OF AN EARTH MAGNETIC SENSOR

(75) Inventors: Sang-on Choi, Suwon-si (KR); Woo-jong Cho, Suwon-si (KR); Woo-jong Lee, Suwon-si (KR); Chan-gook Park, Seoul (KR); Seong-yun Cho, Seoul (KR)

(73) Assignee: Samsung Electric Co., Ltd., Gyeonggi-do (KR)

( * ) Notice: Subject to any disclaimer, the term of this patent is extended or adjusted under 35 U.S.C. 154(b) by 42 days.

(21) Appl. No.: 10/633,700

(22) Filed: Aug. 5, 2003

(65) Prior Publication Data
US 2004/0133349 A1 Jul. 8, 2004

(30) Foreign Application Priority Data
Aug. 6, 2002 (KR) .................. 10-2002-0046366

(51) Int. Cl.[7] ................................................ G01V 3/00
(52) U.S. Cl. ........................................... 702/2; 702/151
(58) Field of Search .................... 702/2, 151; 33/356

(56) References Cited

U.S. PATENT DOCUMENTS

| | | | |
|---|---|---|---|
| 4,414,753 A | * | 11/1983 | Moulin et al. ............ 33/356 |
| 5,786,849 A | | 7/1998 | Lynde |
| 6,539,639 B2 | * | 4/2003 | Smith ...................... 33/356 |
| 6,543,146 B2 | * | 4/2003 | Smith et al. .............. 33/356 |
| 6,813,584 B2 | * | 11/2004 | Zhou et al. .............. 702/151 |
| 2002/0092188 A1 | | 7/2002 | Smith |

* cited by examiner

Primary Examiner—John Barlow
Assistant Examiner—Victor J. Taylor
(74) Attorney, Agent, or Firm—Lee & Morse, P.C.

(57) ABSTRACT

An apparatus for calculating an azimuth angle includes a two-axis earth magnetic sensor, which is mounted on a device that requires azimuth information, for measuring a strength of an earth magnetic field according to the azimuth information if the device moves, an inclinometer for calculating an attitude such as a roll angle and a pitch angle, a signal conditioning unit including an analog-to-digital (A/D) converter for converting sensor data into a digital value, a microprocessor for calculating the azimuth information by compensating for an attitude error using outputs of the two-axis earth magnetic sensor and the inclinometer, a serial communication interface for transmitting the data processed by the microprocessor, and an LCD module for displaying the azimuth information calculated by the microprocessor.

19 Claims, 5 Drawing Sheets

APPARATUS AND METHOD OF COMPENSATING FOR AN ATTITUDE ERROR OF AN EARTH MAGNETIC SENSOR

BACKGROUND OF THE INVENTION

1. Field of the Invention

The present invention relates to a measurement apparatus and calculation method that is able to calculate accurate azimuth information by compensating for an attitude error of an earth magnetic sensor using information on an earth magnetic field obtained from a two-axis earth magnetic sensor and an inclinometer.

2. Description of the Related Art

Up to now, significant research has been performed to identify a method and apparatus for calculating azimuth information of a vehicle or a sensor module, which moves in free space, using an earth magnetic sensor, such as a fluxgate. However, since the fluxgate is expensive and large in size, it has been used only for navigation.

Recently, smaller and lower cost earth magnetic sensor modules have been developed. Due in part to developments in micro-electromechanical systems (MEMS) technology, chip-type earth magnetic sensor modules have been developed and used in diverse fields that require the azimuth information. In application fields where the earth magnetic sensor module cannot be leveled, however, accurate azimuth information cannot be obtained through only the earth magnetic sensor.

Generally, an earth magnetic sensor is a device for measuring the strength of the earth magnetic field. An earth magnetic sensor can measure the strength of the accurate magnetic field only in a case that a flux vector of the earth magnetic field is parallel to a vector of a measurement axis of the sensor for measuring the flux vector. In this case, after a two-axis magnetic sensor, in which each axis is orthogonally arranged in accordance with a right-hand rule, is horizontally mounted to form a sensor module, the azimuth angle indicated by the sensor module is calculated using outputs of the two-axis sensor.

If the earth magnetic sensor module cannot be leveled, however, the strength of the earth magnetic field cannot accurately be measured, and the azimuth information may include a significant error. Consequently, an error according to an attitude should be compensated for, and to provide this compensation, an error compensation through a coordinate conversion is performed using a three-axis earth magnetic sensor and an inclinometer for measuring the attitude.

With the development of a small-sized earth magnetic sensor, the attitude error compensation technique is able to expand into application fields such as sports, multimedia, game machine, and the like.

In the case of using the two-axis earth magnetic sensor, due to the problems of a sensor installation space, however, the error cannot be compensated for through only the developed error compensation technique. Thus, the azimuth angle calculated increases the error according to the size of the attitude.

SUMMARY OF THE INVENTION

A feature of an embodiment of the present invention is to solve at least the above-identified problems and/or disadvantages and to provide at least the advantages described hereinafter.

Another feature of an embodiment of the present invention is to provide an apparatus and method of calculating accurate azimuth information by compensating for an attitude error of a two-axis earth magnetic sensor. In the case that the two-axis earth magnetic sensor is mounted on a device that requires the azimuth information (for example, a navigation system, game machine, PDA, cellular phone, or the like), the apparatus and method according to the present invention calculates the attitude information using a two-axis inclinometer, and then compensates for the error according to the attitude of the earth magnetic sensor to obtain the accurate azimuth information.

To provide the above features of the present invention, there is provided an apparatus for calculating an azimuth angle, including a two-axis earth magnetic sensor, which is mounted on a device that requires azimuth information, for measuring a strength of an earth magnetic field according to the azimuth information if the device moves, an inclinometer for calculating an attitude such as a roll angle and a pitch angle, a signal conditioning unit including an analog-to-digital (A/D) converter for converting sensor data into a digital value, a microprocessor for calculating the azimuth angle by compensating for an attitude error using outputs of the two-axis earth magnetic sensor and the inclinometer, a serial communication interface for transmitting the data processed by the microprocessor, and an LCD module for displaying the azimuth information calculated by the microprocessor.

In another aspect of the present invention, there is provided a method of calculating an azimuth angle, including setting a data output period using an internal timer mounted on a microprocessor, converting an analog value sensed by a sensor into a digital value using an analog-to-digital converter, storing the converted sensor data in an internal register of the microprocessor, calculating an attitude and obtaining a coordinate conversion matrix using data obtained from an inclinometer, generating a virtual Z-axis earth magnetic data using a two-axis earth magnetic sensor, calculating earth magnetic data on a horizontal coordinate system using three-axis earth magnetic data, wherein the three-axis earth magnetic data includes a combination of the two-axis earth magnetic sensor data and the one-axis virtual sensor data, and a coordinate conversion matrix, calculating the azimuth angle using the calculated earth magnetic data, and if a timer interrupt is generated due to the output period set in the internal timer, transmitting the sensor data and the calculated azimuth angle to an external system through a serial communication interface and displaying the sensor data and the calculated azimuth angle on an LCD module.

Generating the virtual Z-axis earth magnetic data preferably includes measuring by experiment a strength of an earth magnetic field measured when a measurement axis of the earth magnetic sensor points in a vertically downward direction toward the earth, calculating the attitude using an output of the inclinometer, measuring a strength of the earth magnetic field sensed in an X-axis direction and a Y-axis direction of a sensor module using the two-axis earth magnetic sensor, and generating the virtual Z-axis earth magnetic data using the calculated attitude of the sensor module and an output value of the two-axis earth magnetic sensor.

Calculating the earth magnetic data on the horizontal coordinate system preferably includes calculating the coordinate conversion matrix using the attitude calculated using an output of the inclinometer, and calculating the earth magnetic data of the horizontal coordinate system by multiplying the generated Z-axis earth magnetic data and the measured X-axis and Y-axis earth magnetic data by the calculated coordinate conversion matrix.

Calculating the azimuth angle using the two-axis earth magnetic sensor preferably includes calculating the attitude using the inclinometer and obtaining the coordinate conversion matrix, generating the virtual Z-axis earth magnetic data, generating the earth magnetic data on the horizontal coordinate system, and calculating the azimuth angle using X-axis and Y-axis data of the earth magnetic data on the horizontal coordinate system.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE PREFERRED EMBODIMENTS

Figure 1:
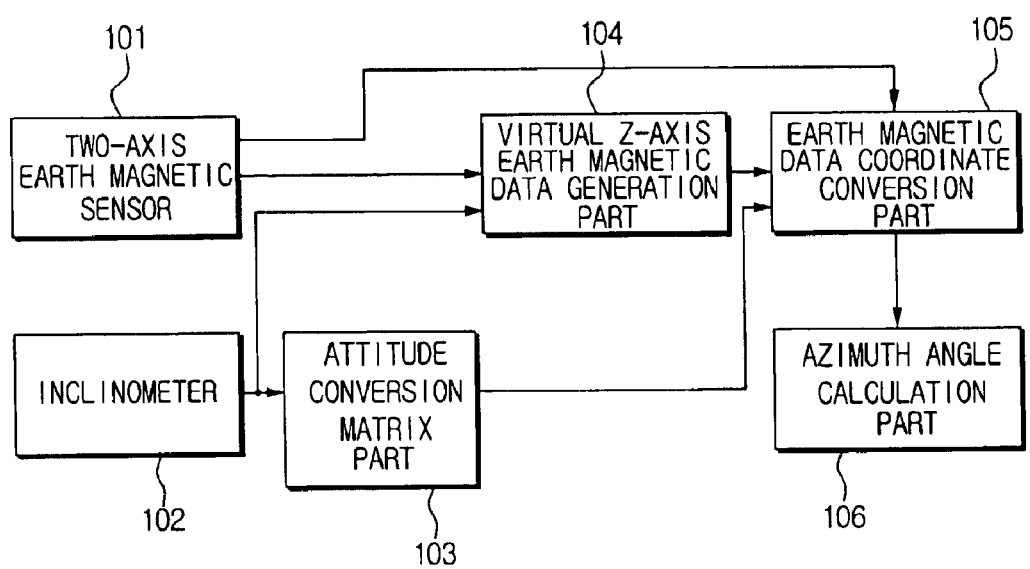
FIG. 1 is a box diagram illustrating a method of calculating an azimuth angle by compensating for an attitude error by a two-axis earth magnetic sensor according to the present invention.

Korean Patent Application No. 2002-46366, filed on Aug. 6, 2002, and entitled: "Apparatus and Method of Compensating for an Attitude Error of an Earth Magnetic Sensor," is incorporated by reference herein in its entirety.

An apparatus and method of calculating an azimuth angle will now be described more fully hereinafter with reference to the accompanying drawings, in which preferred embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

FIG. 1 is a box diagram illustrating a method of calculating an azimuth angle by compensating for an attitude error using a two-axis earth magnetic sensor according to the present invention. The method includes use of a two-axis earth magnetic sensor 101, an inclinometer 102, an attitude (e.g., coordinate) conversion matrix part 103, a virtual Z-axis earth magnetic data generation part 104, a earth magnetic data coordinate conversion part 105, and an azimuth angle calculation part 106.

The earth magnetic sensor 101, which may be a fluxgate sensor or a magnetoresistive (MR), measures a strength of the earth magnetic field, and includes a two-axis earth magnetic sensor having an X-axis in a forward direction of the sensor module and a Y-axis in a direction 90° to the right from the X-axis.

The inclinometer 102 measures a tilt angle of the sensor 101 with respect to the surface of the earth. An accelerometer may be used as the inclinometer. In a case that an accelerometer that measures only the acceleration of gravity at a stationary position, is used as the inclinometer, the attitude information can be calculated by measuring the accelerations of different levels according to the attitude using the two-axis or three-axis module arranged at right angles. In a case using a two-axis accelerometer, the acceleration is measured through Equations 1a and 1b and the attitude is calculated using Equations 2a and 2b.

$$a_x = g \cdot \sin\theta \tag{1a}$$

$$a_y = g \cdot \sin\phi \tag{1b}$$

$$\phi = \sin^{-1}(a_y/g) \tag{2a}$$

$$\theta = \sin^{-1}(a_x/g) \tag{2b}$$

where $a_x$ and $a_y$ are output values of the X-axis and Y-axis accelerometer, respectively, g is the acceleration of gravity, and $\phi$ and $\theta$ are a roll angle and a pitch angle, respectively.

The coordinate conversion matrix part 103 converts the earth magnetic sensor data into a horizontal coordinate system. The coordinate conversion matrix is constructed through Equation 3 using the attitude information calculated using the output value of the inclinometer 102.

$$C_b^h = \begin{bmatrix} \cos\theta & \sin\theta\sin\phi & \sin\theta\cos\phi \\ 0 & \cos\phi & -\sin\phi \\ -\sin\theta & \cos\theta\sin\phi & \cos\theta\cos\phi \end{bmatrix} \tag{3}$$

The virtual Z-axis earth magnetic data generation part 104 is essential to the attitude error compensation of the two-axis earth magnetic sensor. The virtual Z-axis earth magnetic data generation is calculated through Equation 4 using the two outputs of the earth magnetic sensor and the attitude information as calculated above.

$$Z_{jg} = \frac{Z_h + X_{jg}\sin\theta - Y_{jg}\sin\phi\cos\theta}{\cos\phi\cos\theta} \tag{4}$$

where $Z_h$ is a strength of the earth magnetic field first measured by experiment when a measurement axis of the earth magnetic sensor points in a vertically downward direction toward the earth.

The coordinate conversion part 105 of the earth magnetic sensor data to the horizontal coordinate system performs Equation 5 as follows.

$$\begin{bmatrix} X_h \\ Y_h \\ Z_h \end{bmatrix} = C_b^h \begin{bmatrix} X_{jg} \\ Y_{jg} \\ Z_{jg} \end{bmatrix} \tag{5}$$

where $[X_{jg} Y_{jg} Z_{jg}]^T$ is the earth magnetic sensor data.

The azimuth angle calculation part 106 performs Equation 6 using the earth magnetic data the coordinate of which is converted into the horizontal coordinate system.

$$\phi = \tan^{-1}(Y_h/X_h) \tag{6}$$

Figure 2:
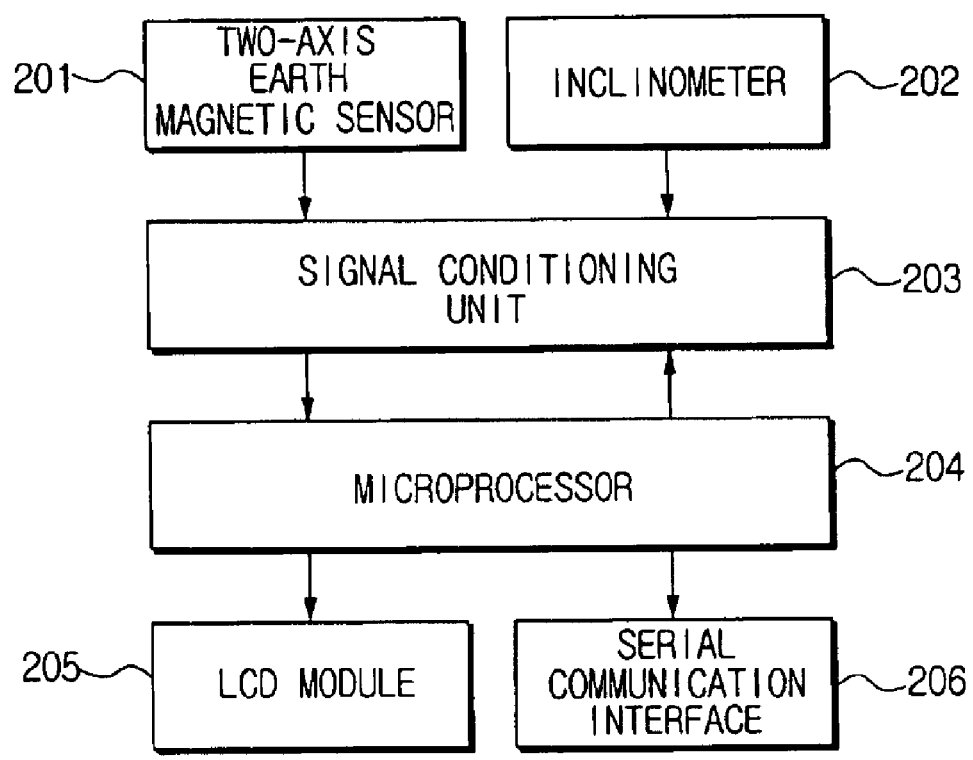
FIG. 2 is a box diagram illustrating the construction of a two-axis earth magnetic sensor and an attitude error compensation apparatus according to the present invention.

FIG. 2 is a box diagram illustrating the construction of an interface for a two-axis earth magnetic sensor constructed to perform the function as described in connection with FIG. 1. The interface includes a two-axis earth magnetic sensor 201, an inclinometer 202, a signal conditioning unit 203, a microprocessor 204, an LCD module 205, and a serial communication interface 206.

The signal conditioning unit 203 includes a low-pass filter for removing a power supply noise and a high-frequency noise, and an analog-to-digital (A/D) converter for converting the analog sensor signal into a digital value. The signal conditioning unit 203 is necessary to process the sensor signal before it is inputted to the microprocessor 204.

The microprocessor 204 includes a register for storing the sensor signal outputted from the A/D converter of the signal conditioning unit 203, an Arithmetic Logic Unit (ALU) and an Floating Point Unit (FPU) for compensating for the attitude error of the earth magnetic sensor and calculating the azimuth angle, and an internal timer for setting a data output period for transmitting the sensor data and the calculated azimuth angle to the LCD module and an external device.

The LCD module 205 displays the azimuth information, i.e., the azimuth angle, outputted from the microprocessor 204 so that a user can recognize the azimuth angle of the device having the earth magnetic sensor module mounted thereon.

The serial communication interface 206 transmits the sensor data and the azimuth information outputted from the microprocessor 204 to the external device. The serial communication interface 206 may adopt asynchronous serial communication or synchronous serial communication type.

Figure 3:
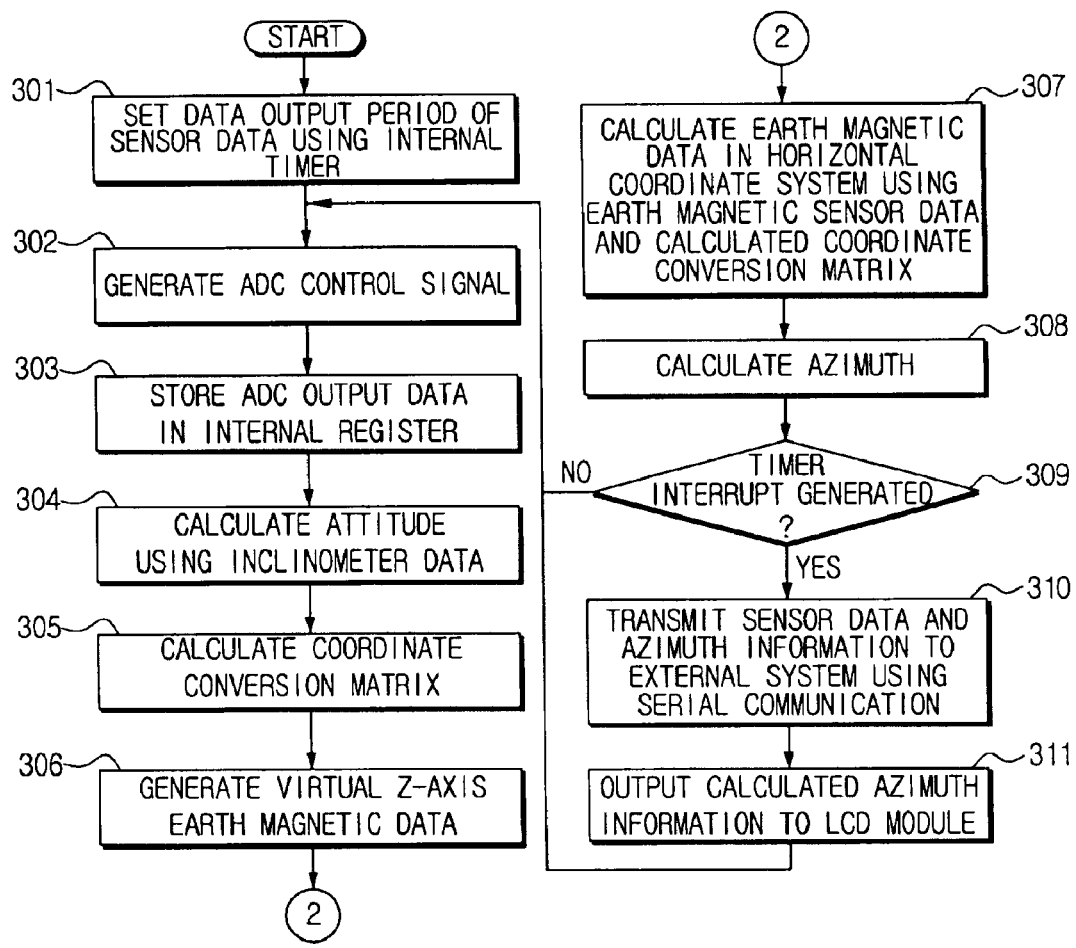
FIG. 3 is a flowchart illustrating the operation of the microprocessor mounted on the two-axis earth magnetic sensor and an attitude error compensation apparatus according to the present invention.

FIG. 3 is a flowchart illustrating an operation of the microprocessor mounted on the two-axis earth magnetic sensor and an attitude error compensation apparatus according to an embodiment of the present invention.

First, in step 301, in order to transmit the output values of the two-axis earth magnetic sensor 201 and the inclinometer 202 and the finally calculated azimuth information to the external system, the data output period is set using the internal timer mounted on the microprocessor 204.

In order to convert the output values of the earth magnetic sensor 201 and the inclinometer 202 into digital values, in step 302, an A/D converter control signal is generated. Then, in step 303, the converted sensor data is stored in the internal register.

In step 304, the attitude of the sensor module is calculated through Equations 2a and 2b using the inclinometer data from among the stored sensor data. Using this calculated attitude, in step 305, the coordinate conversion matrix is calculated through Equation 3.

In step 306, the virtual Z-axis earth magnetic data is generated through Equation 4 using the calculated attitude and the earth magnetic sensor data stored in the internal register.

In step 307, the three-axis earth magnetic data (i.e., a combination of the two-axis earth magnetic sensor data and the one-axis calculated virtual Z-axis earth magnetic data) is converted into the strength of the earth magnetic field in the horizontal coordinate system through Equation 5 using the calculated coordinate conversion matrix. In step 308, using this converted data, the azimuth angle is calculated through Equation 6.

In step 309, it is determined whether an interrupt is generated by the data output period set in the internal timer. If it is determined that the timer interrupt is not generated, the operation returns to step 302, i.e., converting the sensor data into the digital value. Alternatively, if in step 309 it is determined that the timer interrupt is generated, in step 310, the azimuth information calculated as above and the sensor data are transmitted to the external system using the serial communication, and then, in step 311, outputted to the LCD module for display. Subsequently, the operation returns to step 302, i.e., converting sensor data into a digital value, and repeats the subsequent steps until the next timer interrupt is generated.

Figure 4:
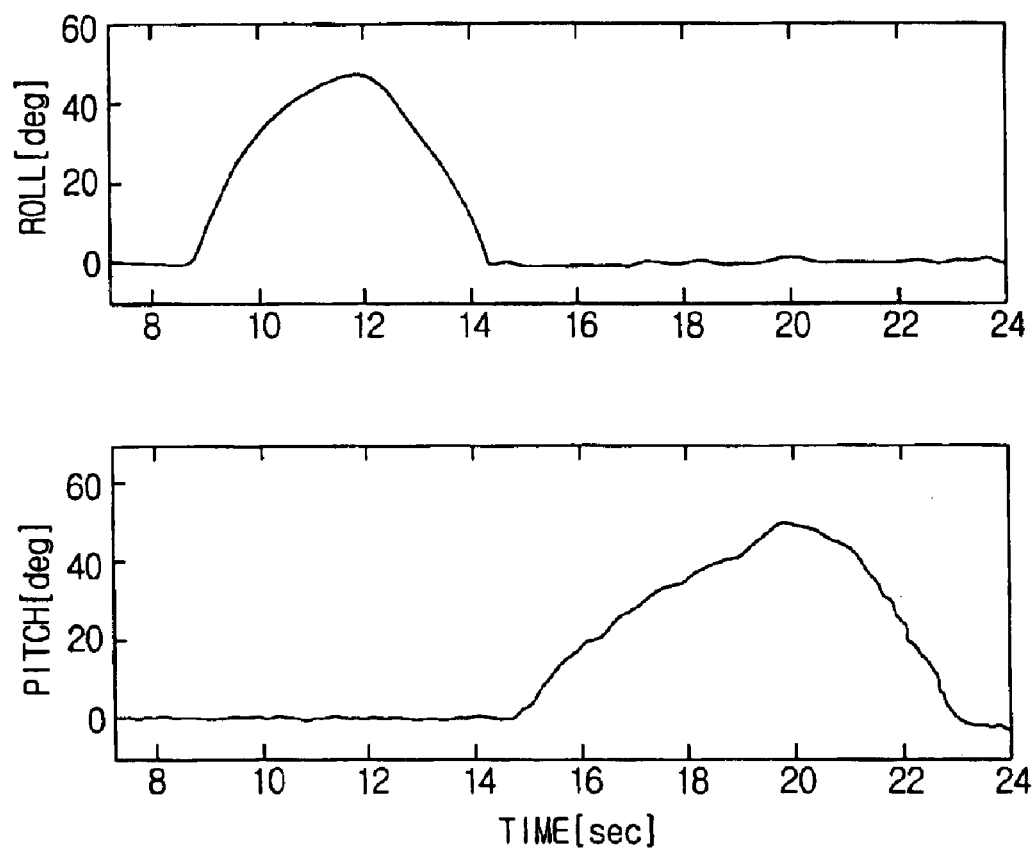
FIG. 4 is a graph illustrating the experimental result of the attitude calculated using the inclinometer according to the present invention.

FIG. 4 is a graph illustrating the experimental result of the attitude calculated through Equation 2 using the inclinometer 202 according to an embodiment of the present invention.

Figure 5:
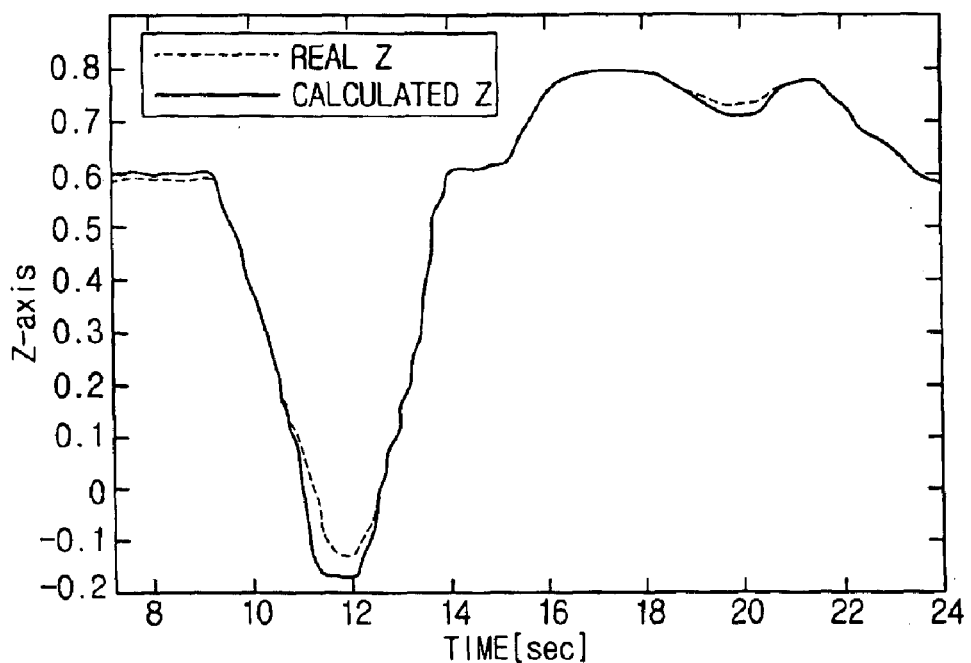
FIG. 5 is a graph illustrating the experimental result of the virtual Z-axis earth magnetic data calculated using the two-axis earth magnetic sensor and the inclinometer.

FIG. 5 is a graph illustrating the experimental result of the virtual Z-axis earth magnetic data calculated through Equation 4 as compared to the real (i.e., actual) Z-axis of the three-axis earth magnetic sensor. In FIG. 5, the dashed line represents the real Z-axis of the three-axis earth magnetic sensor, and the solid line represents the virtual Z-axis earth magnetic data calculated through Equation 4. From FIG. 5, it may be seen that the Z-axis earth magnetic data, which varies according to the change of the attitude, is accurately generated through Equation 4.

Figure 6:
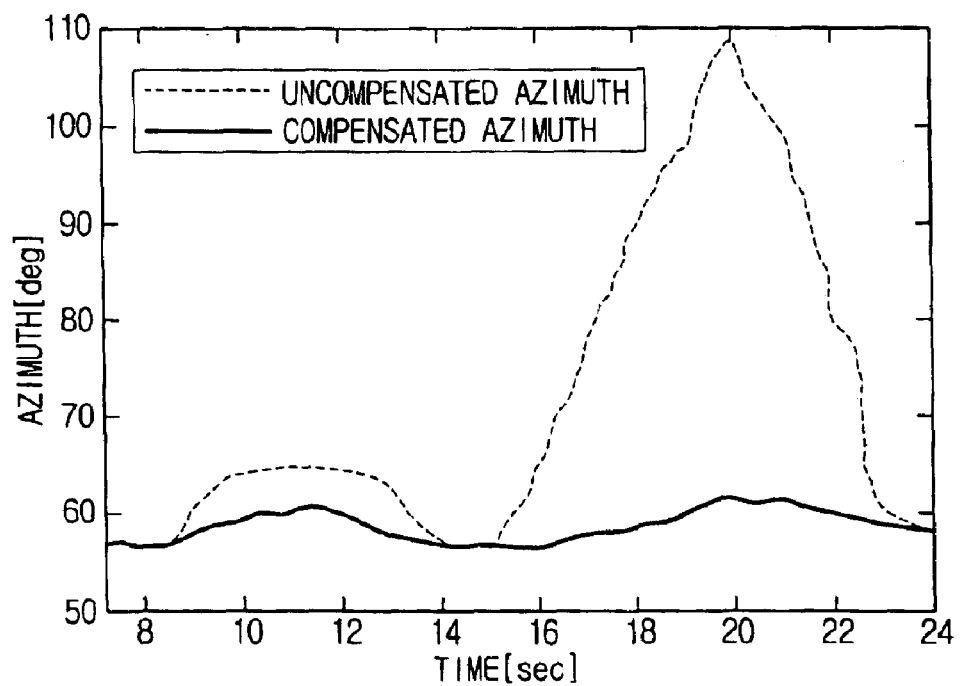
FIG. 6 is a graph illustrating the experimental result of the azimuth angle calculated using the two-axis earth magnetic sensor and the inclinometer.

FIG. 6 is a graph illustrating the experimental result of the azimuth angle calculated through Equations 5 and 6 using the generated virtual Z-axis earth magnetic data, the output of the two-axis earth magnetic sensor, and the calculated coordinate conversion matrix in the case that the attitude is changed. The dashed line represents the uncompensated azimuth angle, which shows a great change of the azimuth angle, while the solid line represents the compensated azimuth angle, which shows that the azimuth angle is changed only within an error range where the change of the azimuth angle is small.

According to the apparatus for calculating the azimuth angle by the attitude error compensation of the earth magnetic sensor according to the present invention, the azimuth information provided to the user overcomes the technical limit of the earth magnetic sensor module, which should use the existing three-axis earth magnetic sensor and the inclinometer, using the two-axis earth magnetic sensor and the two-axis inclinometer.

The present invention can be conveniently used in the case that the azimuth information is required. For example, when it is intended to confirm a user's heading using an electronic map stored in a PDA, the present accurate azimuth angle of the user is recognized and the map is rotated accordingly to be displayed on the LCD of the PDA, so that the user can conveniently determine an accurate heading.

In addition, the present invention facilitates an implementation of a three-dimensional game through the information on the direction of rotation of the game machine in addition to the attitude of the game machine. Further, the present invention can be used as a data input device in connection with virtual reality.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. An apparatus for calculating an azimuth angle, comprising:

a two-axis earth magnetic sensor, which is mounted on a device that requires azimuth information, for measuring a strength of an earth magnetic field according to the azimuth information if the device moves;

an inclinometer for calculating an attitude such as a roll angle and a pitch angle;

a signal conditioning unit including an analog-to-digital (A/D) converter for converting sensor data into a digital value; and a microprocessor for calculating the azimuth information by compensating for an attitude error using outputs of the two-axis earth magnetic sensor and the inclinometer, the microprocessor including a virtual Z-axis earth magnetic data generation part for generating virtual Z-axis earth magnetic data based on the outputs of the two-axis magnetic sensor and the inclinometer.

2. The apparatus for calculating an azimuth angle as claimed in claim 1, wherein the two-axis earth magnetic sensor is either a fluxgate sensor or a magnetoresistive (MR).

3. The apparatus for calculating an azimuth angle as claimed in claim 1, wherein the inclinometer is an accelerometer.

4. The apparatus for calculating an azimuth angle as claimed in claim 1, wherein the signal condition unit further comprises:
a low-pass filter for removing a power supply noise and a high-frequency noise.

5. The apparatus for calculating an azimuth angle as claimed in claim 1, wherein the microprocessor comprises:
a register for storing the sensor data output from the signal conditioning unit; and
an Arithmetic Logic Unit (ALU) and an Floating Point Unit (FPU) for compensating for the attitude error of the earth magnetic sensor and for calculating the azimuth angle.

6. The apparatus for calculating an azimuth angle as claimed in claim 1, further comprising a serial communication interface for transmitting the sensor data and the azimuth information.

7. The apparatus for calculating an azimuth angle as claimed in claim 1, further comprising an LCD module for displaying the azimuth information.

8. The apparatus for calculating an azimuth angle as claimed in claim 7, further comprising an internal timer for setting a data output period for transmitting the sensor data and the calculated azimuth angle to the LCD module.

9. A method of calculating an azimuth angle, comprising:
converting an analog value sensed by a sensor into a digital value using an analog-to-digital converter;
storing the converted sensor data in an internal register of the microprocessor;
calculating an attitude and obtaining a coordinate conversion matrix using data obtained from an inclinometer;
generating a virtual Z-axis earth magnetic data using a two-axis earth magnetic sensor;
calculating earth magnetic data on a horizontal coordinate system using three-axis earth magnetic data, wherein the three-axis earth magnetic data includes a combination of the two-axis earth magnetic sensor data and the one-axis virtual sensor data, and a coordinate conversion matrix; and
calculating the azimuth angle using the calculated earth magnetic data.

10. The method as claimed in claim 9, wherein generating the virtual Z-axis earth magnetic data comprises:
measuring by experiment a strength of an earth magnetic field measured when a measurement axis of the earth magnetic sensor points in a vertically downward direction toward the earth;
calculating the attitude using an output of the inclinometer;
measuring a strength of the earth magnetic field sensed in an X-axis direction and a Y-axis direction of a sensor module using the two-axis earth magnetic sensor; and
generating the virtual Z-axis earth magnetic data using the calculated attitude of the sensor module and an output value of the two-axis earth magnetic sensor.

11. The method as claimed in claim 10, wherein calculating the earth magnetic data on the horizontal coordinate system comprises:
calculating the coordinate conversion matrix using the attitude calculated using an output of the inclinometer; and
calculating the earth magnetic data of the horizontal coordinate system by multiplying the generated virtual Z-axis earth magnetic data and the measured X-axis and Y-axis earth magnetic data by the calculated coordinate conversion matrix.

12. The method as claimed in claim 11, wherein calculating the azimuth angle using the two-axis earth magnetic sensor comprises:
calculating the attitude using the inclinometer and obtaining the coordinate conversion matrix;
generating the virtual Z-axis earth magnetic data;
generating the earth magnetic data on the horizontal coordinate system; and
calculating the azimuth angle using X-axis and Y-axis data of the earth magnetic data on the horizontal coordinate system.

13. The method as claimed in claim 9, further comprising setting a data output period using an internal timer mounted on a microprocessor, prior to converting the analog value sensed by the sensor into the digital value.

14. The method as claimed in claim 13, further comprising, if a timer interrupt is generated due to the output period set in the internal timer, transmitting the sensor data and the calculated azimuth angle to an external system through a serial communication interface and displaying the sensor data and the calculated azimuth angle on an LCD module.

15. A method of calculating an azimuth angle, comprising:
measuring a strength of an earth magnetic field according to azimuth information using a two-axis earth magnetic sensor mounted on a device that requires azimuth information, if the device moves;
calculating an attitude using an inclinometer;
converting sensor data into a digital value; and
calculating the azimuth information by compensating for an attitude error using outputs of the two-axis earth magnetic sensor and the inclinometer, the calculating including generating virtual Z-axis earth magnetic data based on the outputs of the two-axis magnetic sensor and the inclinometer.

16. The method of calculating an azimuth angle as claimed in 15, wherein converting sensor data into the digital value comprises using a signal conditioning unit including an analog-to-digital (A/D) converter.

17. The method of calculating an azimuth angle as claimed in 15, further comprising transmitting the sensor data and the azimuth information.

18. The method of calculating an azimuth angle as claimed in 15, further comprising displaying the azimuth information.

19. The method of calculating an azimuth angle as claimed in 15, wherein converting the sensor data further comprises removing a power supply noise and a high-frequency noise.

* * * * *

UNITED STATES PATENT AND TRADEMARK OFFICE
CERTIFICATE OF CORRECTION

PATENT NO. : 6,931,323 B2  
APPLICATION NO. : 10/633700  
DATED : August 16, 2005  
INVENTOR(S) : Sang-on Choi et al.

Page 1 of 1

It is certified that error appears in the above-identified patent and that said Letters Patent is hereby corrected as shown below:

On the Title Page, item (73) should read:

-- (73) Assignees: Samsung Electronics Co., Ltd.,
Kyungki-do, (KR)
and
Chan-Gook PARK
Seoul, (KR) --

Signed and Sealed this
Sixteenth Day of July, 2013

Teresa Stanek Rea
*Acting Director of the United States Patent and Trademark Office*